United States Patent [19]

Thompson

[11] Patent Number: 5,524,946

[45] Date of Patent: Jun. 11, 1996

[54] IRRIGATION PIPE TOOLS

[76] Inventor: Andy L. Thompson, R.R. 1, Courtland, Kans. 66939

[21] Appl. No.: 274,733

[22] Filed: Jul. 18, 1994

[51] Int. Cl.$^6$ ..................................................... B65G 7/12
[52] U.S. Cl. ................... 294/16; 81/99; 294/17; 294/104
[58] Field of Search ..................... 294/11, 15–17, 294/19.1, 26, 90, 92, 104; 81/98, 99; 254/94, 119, 131

[56] References Cited

U.S. PATENT DOCUMENTS

| 181,693 | 8/1876 | Lloyd | 294/17 |
|---|---|---|---|
| 870,449 | 11/1907 | May | 81/98 |
| 1,205,852 | 11/1916 | Buehler | 294/15 |
| 1,401,046 | 12/1921 | Clymer | 294/15 |
| 2,026,516 | 1/1936 | Chesnut et al. | 81/99 |
| 2,378,454 | 6/1945 | Werling | 294/15 |
| 2,517,041 | 8/1950 | Sisley | 81/99 X |
| 2,559,973 | 7/1951 | Kunz | 81/99 |
| 2,697,000 | 12/1954 | Giffin | 294/15 |
| 2,788,237 | 4/1957 | Misiura | 294/17 |
| 2,819,111 | 1/1958 | Cozzens | 294/16 X |
| 2,873,995 | 2/1959 | Turner | 294/15 |
| 2,915,333 | 12/1959 | Koenig et al. | 294/16 X |
| 3,347,586 | 10/1967 | Sharp | 294/104 X |
| 4,013,313 | 3/1977 | Gardels | 294/17 |
| 5,024,476 | 6/1991 | Massey | 294/16 |

FOREIGN PATENT DOCUMENTS 2207384  2/1989  United Kingdom ................ 294/16

*Primary Examiner*—Johnny D. Cherry
*Attorney, Agent, or Firm*—Jeffrey L. Thompson

[57] ABSTRACT

A pipe manipulating tool having an elongated handle and a pipe engaging portion that grips a pipe when a unidirectional force is applied to the handle. A pipe engaging portion of a first pipe rotating tool has a first arcuate jaw pivotally mounted to the handle and a second arcuate jaw fixedly mounted to the handle. A spring biases the jaw members into clamping engagement with a pipe during use. A pipe engaging portion of a second pipe rotating tool has an arcuate member fixed to the handle with an engagement tooth fixed at a free end of the arcuate member for engaging a hook-receiving recess of a bell end of an irrigation pipe. A pipe engaging portion of a third pipe tool includes an engagement tooth extending axially from the handle to engage in a groove recess of a bell end of an irrigation pipe. A stabilizing member is also fixed to the handle so that the tool can be used to pull apart irrigation pipe without gripping the bell end of the pipe by hand. The tools use particular geometries for enhanced leverage to reduce physical strain on the operator during irrigation pipe moving operations.

19 Claims, 4 Drawing Sheets

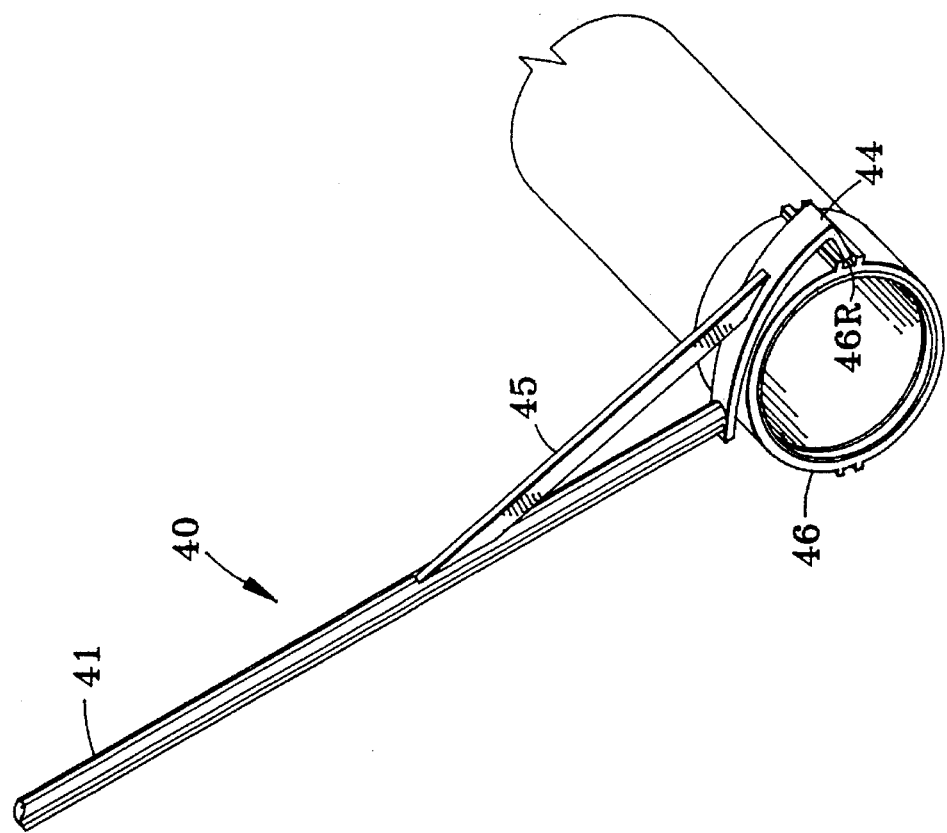
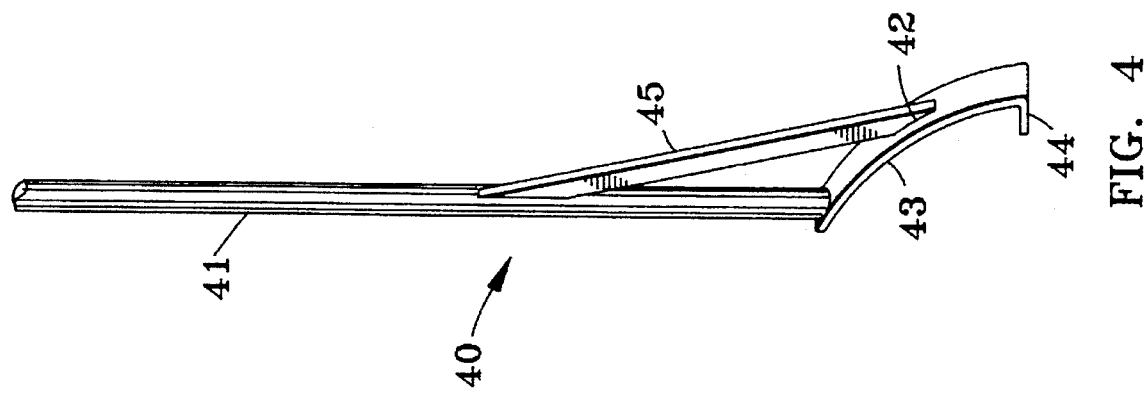
FIG. 5
FIG. 4

IRRIGATION PIPE TOOLS

BACKGROUND OF THE INVENTION

1. Field of the Invention

This invention relates generally to tools for manipulating pipe, and in particular, to hand-held tools for engaging various portions of irrigation pipe to manipulate the pipe without undue physical strain on the operator.

2. Description of the Prior Art

There are many types of irrigation systems known in the prior art. One common system with which the present invention is particularly well suited for use includes a series of pipe joints connected together across an end of a field. The pipe joints each typically have a female bell connector at one end and a male connector at the other end. Several (e.g., 6 to 18) adjustable gate valves are typically spaced along the length of each pipe joint. The pipe joints are typically made of aluminum or plastic and range in size from 20 to 36 feet in length and 6 to 12 inches in diameter, with a 30 foot length and 8 to 10 inch diameter being the most common. The pipe joints typically weigh approximately 50 to 150 pounds, depending on the size and material of the pipe and the amount of sediment accumulated within the pipe.

Irrigating is often the most labor intensive task on an agricultural farm in areas having inadequate rainfall. The irrigation system described above using pipe joints requires the pipe joints to be carried to the field to be irrigated at the beginning of each irrigating season, laid across the end of the field, connected together by inserting the male ends into the female ends of adjacent pipes, and adjusting the flow of water through the adjustable gate valves each time water is applied to the crop. It is often necessary to rotate the pipe after it has been connected together across the end of the field in order to direct the flow of water out of the gate valves to an appropriate angle away from the pipe. In addition, at the end of the season, the pipe usually must be disconnected, picked up, and carried out of the field.

Two of the most physically demanding tasks with the irrigation pipe system described above are turning the pipe to adjust the angle of the water flow after the pipe joints are connected together (especially if the pipe is filled with water), and disconnecting the pipe joints at the end of the irrigating season. The difficulty of these tasks is increased after the pipe settles during the irrigation season (typically one to three months), after sediment accumulates within the pipe, or as vegetative growth is allowed to grow under and around the pipe. A rubber gasket is typically used to seal the connection joints against leakage, thus increasing the force required to rotate and disconnect the pipe joints.

One known prior art system for rotating irrigation pipe has a pair of clamping jaws and a scissor-type handle for engaging the pipe. This system requires the use of two hands to operate the handle to apply a clamping force to the pipe. Thus, in situations where the operator's hands are full of other tools, such as shovels and gate changer tools, the known turning tool is unwieldy and not very useful. This known tool is also relatively complex, making it more difficult and expensive to manufacture.

The common method of disconnecting the pipe joints at the end of the irrigation season is to grip the bell end of the pipe with the operator's hands (preferably wearing gloves to avoid cuts and abrasions) and twisting and pulling until the adjacent pipe connection comes apart. This method is, of course, very strenuous on the irrigator, often resulting in lower back pain, sore hands, and physical exhaustion. In addition, the irrigator is limited as to the amount of force he can apply without his hands slipping from the pipe.

Thus, there is a need for devices to reduce the physical exertion required for these tasks without the disadvantages of the prior art described above.

SUMMARY OF THE INVENTION

It is an object of the present invention to provide tools for manipulating pipe without undue physical strain on the operator while enhancing the operator's ability to rotate and/or disconnect pipe joints.

It is a further object of the present invention to provide irrigation pipe tools which are lightweight, and are relatively simple and inexpensive to manufacture.

It is yet a further object of the present invention to provide irrigation pipe tools for rotating individual pipe joints using a single direction force applied to the handle of the tool.

It is yet another object of the present invention to provide an irrigation pipe tool for gripping an open bell end of a pipe for pulling adjacent pipes apart.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects and in accordance with the purpose of the present invention, as embodied and broadly described herein, the device of a first embodiment of this invention comprises a pipe manipulating tool comprising an elongated handle and a pipe engaging portion connected at one end of the handle. The pipe engaging portion includes means for gripping and manipulating a portion of a pipe when a unidirectional force is applied to the handle.

In a first embodiment of the invention, the means for gripping comprises a first jaw pivotally mounted to the handle about a pivot connection point, and a second jaw fixedly mounted to the handle, the first and second jaws being constructed so as to engage opposite sides of a pipe during use. The first jaw comprises an arcuate member removably mounted to the handle. A spring means is provided for biasing the first jaw into clamping engagement with a pipe during use. The first jaw includes an arcuate pipe engaging portion, and an abutment portion having means for limiting pivotal movement of the first jaw, the pivot connection point of the first jaw being located between the arcuate pipe engaging portion and the abutment portion. A flange is connected to an intermediate portion of the handle, and the spring means comprises a tension spring connected between the flange and the abutment portion. A plurality of apertures are spaced along a length of the flange to adjust a tension in the spring.

In a second embodiment of the present invention the pipe engaging portion of the tool comprises an arcuate member having a first end fixed to the handle and a second free end, and an engagement tooth extending radially inward from the second free end. An angle brace extends between the handle and a point on the arcuate member between the first and second ends. The engagement tooth extends at an angle of less than 90 degrees from the second end of the arcuate member, and the first end of the arcuate member forms an angle greater than 90 degrees with the handle.

In a third embodiment of the present invention, the pipe engaging portion of the tool comprises an engagement tooth extending from the handle in a longitudinal direction of the handle, a stabilizing member portion extending generally perpendicularly to the engagement tooth, and means for fixing the stabilizing member portion to the handle with an opening between the engagement tooth and the stabilizing member portion for receiving an edge of a bell end of a pipe. The engagement tooth and the stabilizing member portion are formed from an integral band, the integral band including a back side and a top side disposed between the stabilizing member portion and the engagement tooth, the back side being generally parallel with the engagement tooth and the top side being generally parallel with the stabilizing member portion. A hand grip is fixed to the handle at an end thereof opposite the pipe engaging portion. A flat plate reinforcement flange is fixed to an outer periphery of the back side and the stabilizing member portion of the pipe engaging portion.

BRIEF DESCRIPTION OF DRAWINGS

The present invention will become more clearly appreciated as the disclosure of the present invention is made with reference to the accompanying drawings wherein:

FIG. 4 is a plan view of a pipe turning tool according to a second embodiment of the present invention;

FIG. 5 is a perspective view of the pipe turning tool of FIG. 4 in operation;

DETAILED DESCRIPTION OF INVENTION

Reference will now be made in detail to the preferred embodiments of the invention, examples of which are illustrated in the accompanying drawings.

Figure 1:
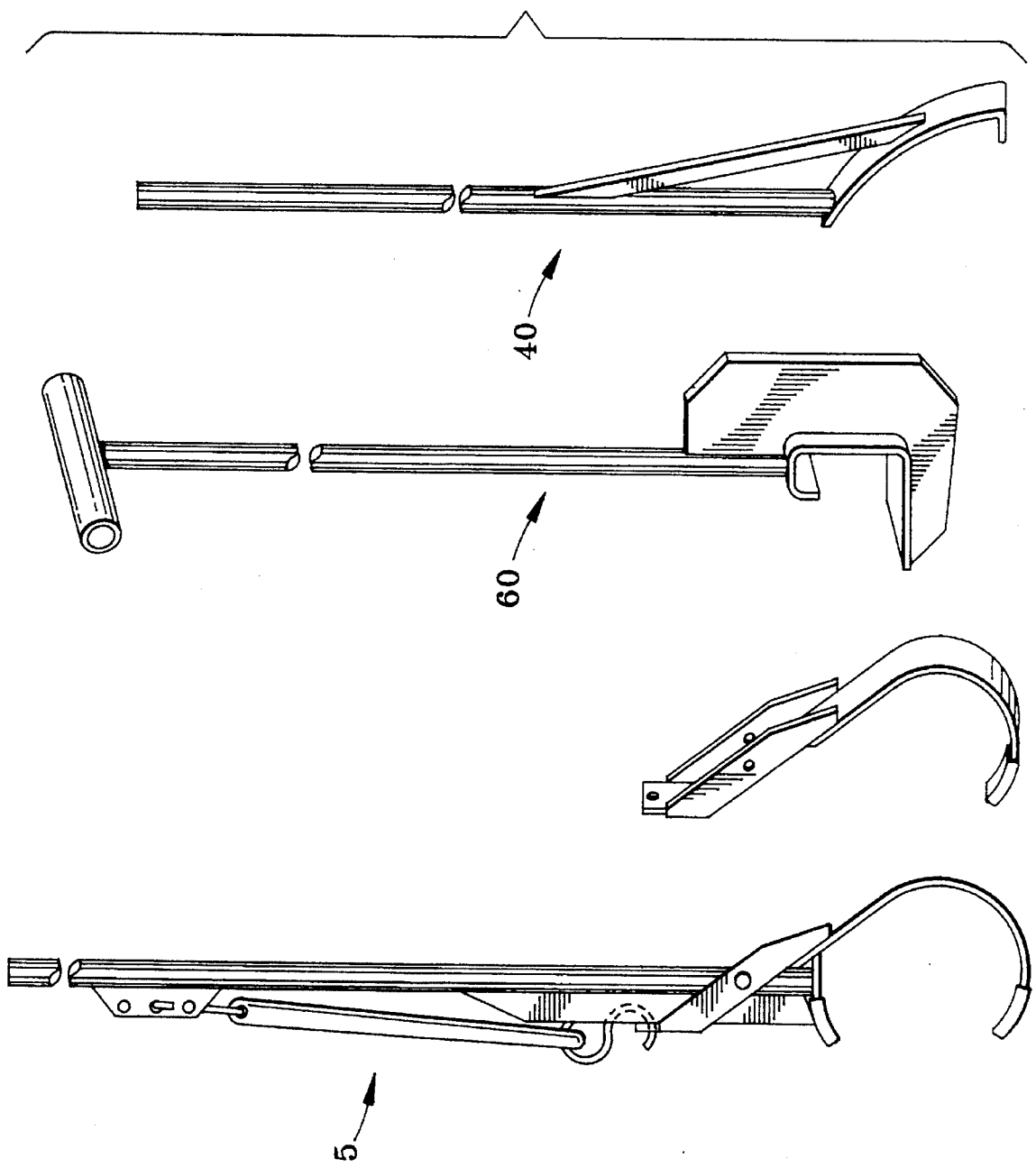
FIG. 1 shows three embodiments of hand-held tools according to the present invention for manipulating irrigation pipe.

The present invention is directed to hand-held tools for manipulating irrigation pipe or other objects of a similar structure. FIG. 1 shows a first tool 5 (on the left) for engaging a smooth outside surface of a pipe for turning the pipe; a second tool 40 (on the right) for engaging a bell end of a typical irrigation pipe for turning the pipe; and a third tool 60 (in the center) for engaging a bell end of a typical irrigation pipe for pulling the pipe. The structure and function of these tools are explained below.

Figure 3:
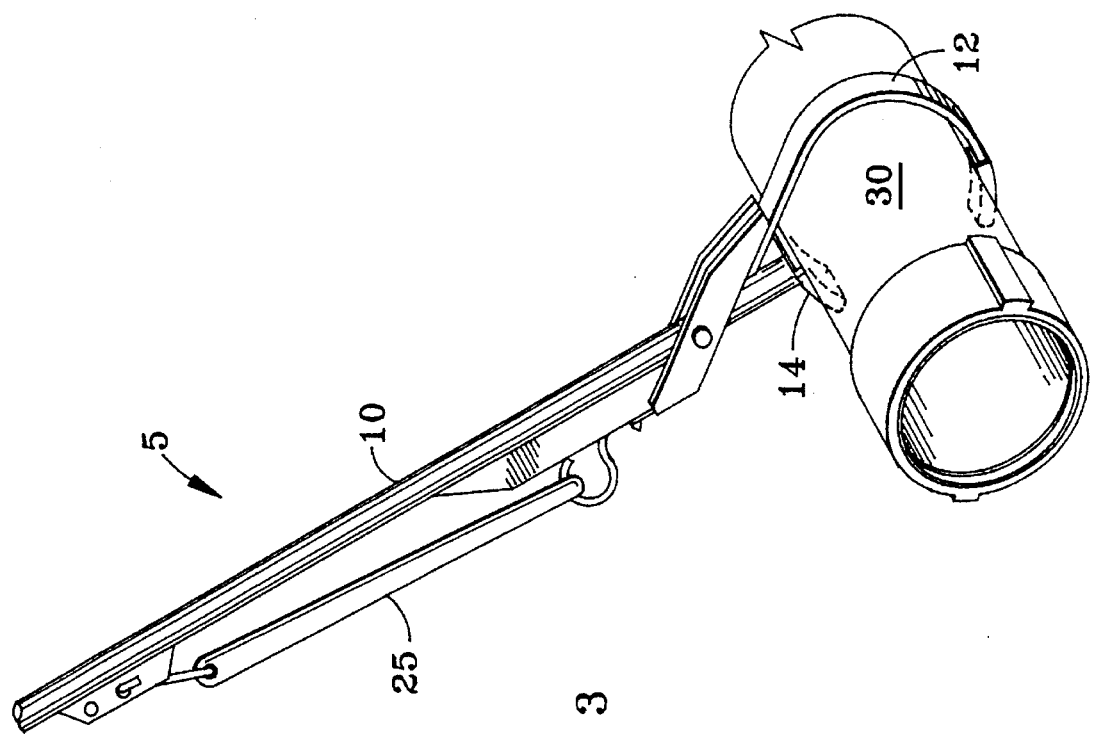
FIG. 3 is a perspective view showing the pipe turning tool of FIG. 2 in operation.
Figure 2:
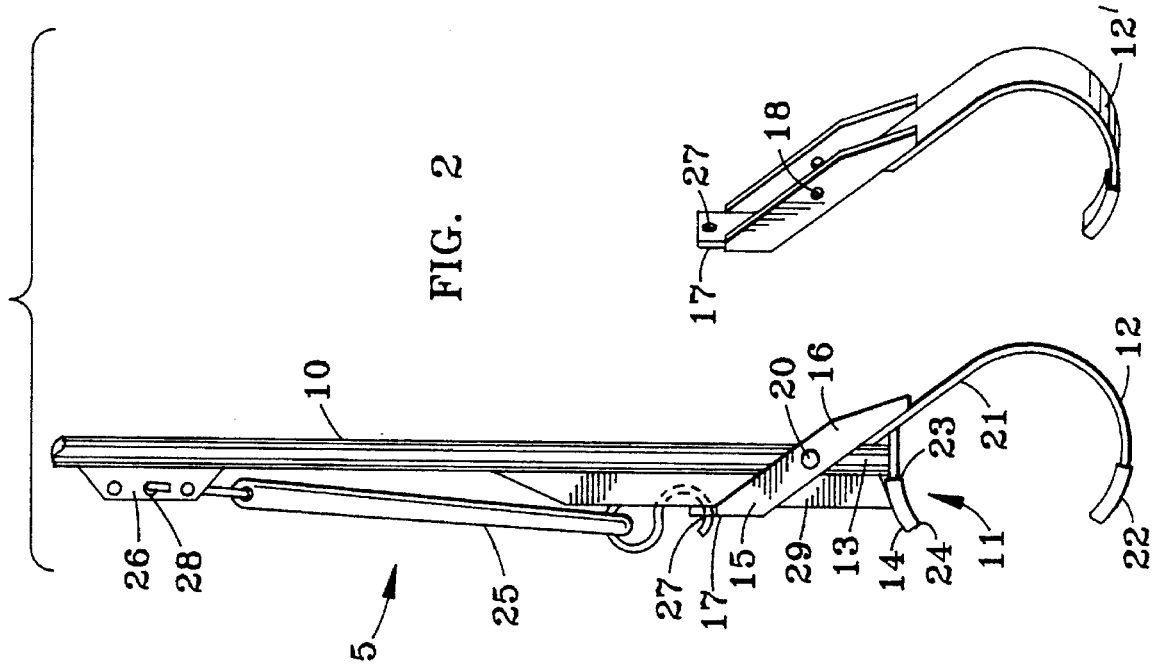
FIG. 2 is a plan view of a pipe turning tool according to a first embodiment of the present invention.

Referring to FIGS. 2 and 3, the pipe turning tool 5 according to a first embodiment includes an elongated handle 10 and a pipe engaging portion 11. The pipe engaging portion 11 has a pivoting jaw 12 pivotally mounted to the handle 10 near a first end 13 of the handle, and a fixed jaw 14 fixedly mounted to the first end 13 of the handle. As shown in FIG. 3, the pivoting jaw 12 and the fixed jaw 14 engage diametrically opposite sides of a pipe during use.

The pivoting jaw 12 includes a fork portion 15 which straddles the handle 10. The fork portion 15 includes two flat side plates 16 and an abutment portion 17 bridging the side plates 16 at a first end thereof. The side plates 16 each have an aperture 18 extending therethrough at a location intermediate the ends of the side plates 16. An aperture (not shown) corresponding to the apertures 18 is formed in the handle 10. A bolt 20 extends through the apertures 18 and the aperture in the handle for pivotally mounting the jaw 12 to the handle 10. The pivoting jaw 12 also includes a pipe engaging portion in the form of an arcuate band 21 fixed to the end of the side plates 16 opposite the abutment portion 17. The arcuate band 21 extends circumferentially from the handle 10 approximately 160 to 200 degrees in a first direction about a pipe to be turned. A rubber sleeve 22 preferably covers the free end of the arcuate band 21 to enhance friction between the tool and the surface of the pipe to be turned.

The fixed jaw 14 is also in the form of an arcuate band 23 which preferably has a rubber sleeve 24 covering a free end thereof. The arcuate band 23 extends circumferentially from the handle 10 approximately 20 to 50 degrees in a second direction opposite from the first direction of the arcuate band 21 (i.e., the arcuate band 23 is substantially shorter than the arcuate band 21). The pivoting jaw 12 can be easily changed by removing the bolt 20 and sliding the jaw 12 over the handle 10. A second pivoting jaw 12' with an arcuate band having a different radius than the arcuate band 21 of the original pivoting jaw 12 can then be connected to the handle 10 for engaging and turning pipe of a different size.

A spring biasing arrangement is provided for biasing the pivoting jaw 12 into clamping engagement with the pipe during use. The spring biasing arrangement includes a tension spring in the form of a rubber strap 25 connected between a flange 26 extending from an intermediate portion of the handle 10 and an aperture 27 formed in the abutment portion 17 of the pivoting jaw 12. The rubber strap 25 biases the pivoting member in a clockwise direction with respect to the handle 10, as viewed in FIG. 2. The flange 26 includes a plurality of apertures 28 spaced therealong to enable adjustment of the length and tension of the rubber strap 25 during use. The higher the tension in the rubber strap 25, the higher the gripping force of the tool on the pipe. An additional flange 29 extends along the handle 10 to reinforce the handle and the fixed jaw 14 and to provide an abutment surface for the abutment portion 17 of the pivoting jaw 12.

The operation of the pipe turning tool of the first embodiment is shown in FIG. 3. The tool is positioned about the outer surface of the pipe 30 at any position along the length of the pipe. The pivoting jaw 12 is positioned on a diametrically opposite side of the pipe 30 from the fixed jaw 14 so that the clamping action of the jaws acts to securely grip the pipe for turning. The lever action of the elongated handle 10, in combination with the geometry of the pivoting and spring biasing arrangement, enable the tool to easily grip and turn a pipe when an operator applies force on the handle in a direction of turning (counter-clockwise as shown in FIG. 3). The tool may be quickly adapted for use with different size pipe by replacing the pivoting jaw 12 with the different size jaw 12'. For example, the first jaw 12 may be sized for ten inch irrigation pipe and the second jaw 12' may be sized for eight inch irrigation pipe.

Referring to FIGS. 4 and 5, a pipe turning tool 40 according to a second embodiment of the present invention is shown. The pipe turning tool 40 includes an elongated handle 41, and an engaging portion 42. The engaging portion 42 has an arcuate-shaped band member 43 with a radius of curvature which is slightly greater than the radius of a bell end of a pipe to be turned. The end of the band member 43 connected to the handle 41 forms an obtuse angle with the handle of approximately 120 to 140 degrees. An engagement tooth 44 extends from a free end of the arcuate member 43 at an angle slightly less than 90 degrees. A distance between the end of the band member 43 connected to the handle and the engagement tooth 44 of about 6 to 9 inches is preferable for a typical bell end of a 10 inch diameter irrigation pipe. An angle brace 45 extends between the handle 41 and the arcuate member 43 to reinforce the engaging portion 42 during heavy use.

In operation, as shown in FIG. 5, the tool 40 is placed over a bell end 46 of a conventional irrigation pipe so that the engagement tooth 44 extends into a hook-receiving recess 46R on either side of the pipe. The pipe is then rotated to a desired position by applying a force to the handle 41 in the desired direction of rotation. As shown in FIG. 5, the tool 40 is positioned for rotating the pipe in a counter-clockwise direction. Since the tool 40 has no moving parts, it is very simple to operate, making it especially convenient for use in conditions where the operator is carrying other tools (e.g., shovels, gate changers, etc.) or has only one usable hand.

Figure 7:
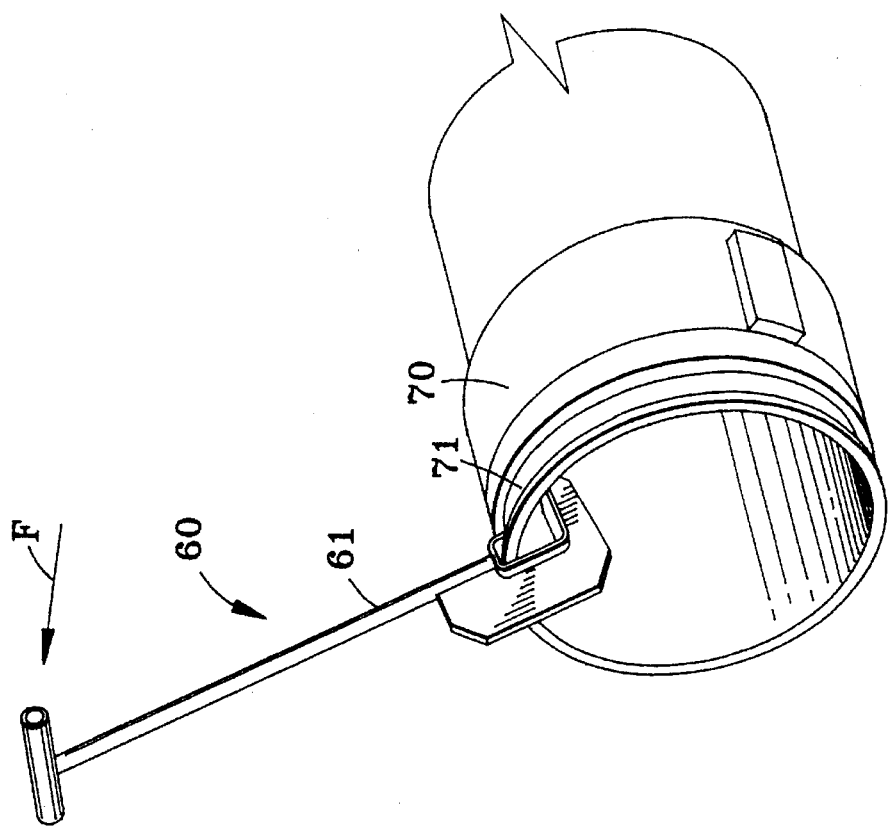
FIG. 7 is a perspective view of the pipe pulling tool of FIG. 6 in operation.
Figure 6:
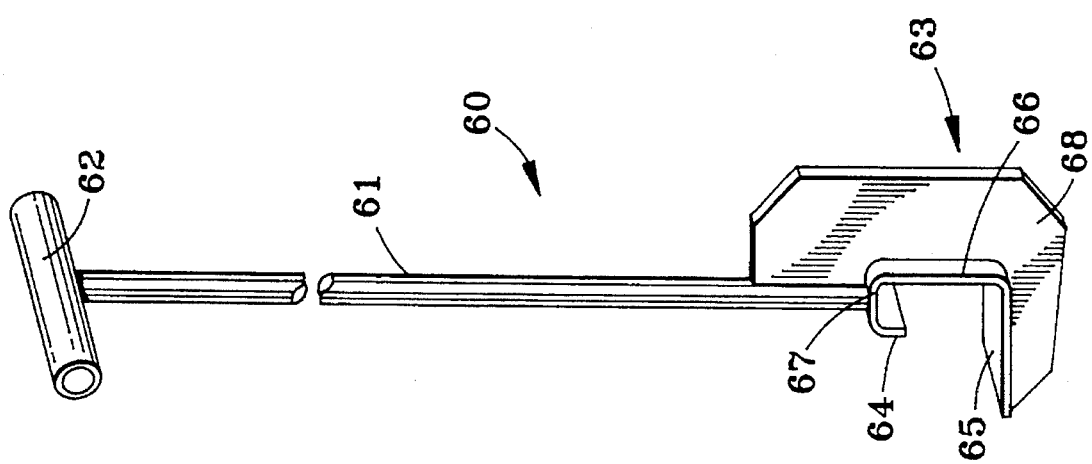
FIG. 6 is a plan view of a pipe pulling tool according to a third embodiment of the present invention.

Referring to FIGS. 6 and 7, a pipe handling tool 60 according to the third embodiment is shown. The tool 60 includes an elongated handle 61 with a short handgrip 62 connected at one end thereof. A pipe engaging portion 63 is connected to the handle 61 at an end opposite the handgrip 62. The engaging portion 63 includes an engagement tooth 64 and a stabilizing member 65. The tooth 64 extends generally parallel to the handle 61, while the stabilizing member 65 extends generally perpendicular thereto. In a preferred embodiment, the tooth 64 and stabilizing member 65 form an integral band with a backside 66 and a topside 67 integrally formed therebetween. A flange 68 in the form of a flat plate extends around an outer periphery of the engaging portion 63 to prevent stress deformation of the stabilizing member 65 with respect to the engagement tooth 64 during operation.

In operation, as shown in FIG. 7, the pipe handling tool 60 is positioned over a bell end 70 of a conventional irrigation pipe so that the engagement tooth 64 is received in a groove 71 adjacent the bell opening. The stabilizing member 65 extends inside the bell end 70 and engages an inner wall thereof. The stabilizing member 65 is of a sufficient length (e.g., 5 inches) to reduce local bending stress on the bell end 70 during use. With the tool 60 in engagement with the bell end 70, a pulling force can be exerted on the handle 61 in the direction F for disengaging the pipe from a bell end of an adjacent pipe (not shown).

The tool 60 greatly reduces the physical strain required to pull apart a pipe line at the end of an irrigation season. The tool 60 reduces the amount of stooping required by the operator, and enhances pulling power by providing a handgrip 62 for the operator. The tool 60 has no moving parts, making it very durable and easy to operate.

It will be appreciated that the present invention is not limited to the exact construction which has been described above and which is illustrated in the accompanying drawings, and that various modifications and changes can be made without departing from the scope thereof. It is intended that the scope of the invention only be limited by the appended claims.

What is claimed is:

1. A pipe manipulating tool comprising:
   an elongated handle; and
   a pipe engaging portion connected at one end of the handle, said pipe engaging portion having means for securely gripping a portion of a pipe for selectively manipulating the pipe when a unidirectional force is applied to said handle;
   said means for gripping comprising a first jaw pivotally mounted to said handle about a pivot connection point, a second jaw fixedly connected to said handle, and a spring means for biasing said first and second jaws into engagement with opposite sides of a pipe during use;
   said first jaw comprising an arcuate band portion for engaging a pipe to be turned, and a mounting portion for pivotally mounting said first jaw to said handle, said mounting portion having said pivot connection point extending therethrough, said pivot connection point being located between the arcuate band portion and a spring mounting means for connecting a first end of said spring means to said first jaw;
   said arcuate band portion of said first jaw extending circumferentially from said pivot connection point approximately 160 to 200 degrees in a first direction, and said second jaw including a second arcuate pipe engaging portion extending circumferentially from said handle approximately 20 to 50 degrees in a second direction opposite from said first direction.

2. The pipe manipulating tool as set forth in claim 1, wherein said first jaw is removably mounted to said handle.

3. The pipe manipulating tool as set forth in claim 1, wherein said first jaw further comprises an abutment portion having means for limiting pivotal movement of the first jaw, said pivot connection point being located between the arcuate band portion and the abutment portion.

4. The pipe manipulating tool as set forth in claim 1, further comprising a flange connected to an intermediate portion of said handle, and said spring means comprising a tension spring having a first end connected to said spring mounting means and a second end connected to said flange.

5. The pipe manipulating tool as set forth in claim 4, wherein said flange includes a plurality of apertures spaced along a length of said handle to adjust a tension in said spring.

6. The pipe manipulating tool as set forth in claim 1, further comprising a reinforcing flange connected to said handle adjacent said pipe engaging portion on a side of said handle opposite said arcuate band portion of said first jaw, said reinforcing flange having an abutment surface for engaging said abutment portion of said first jaw to limit pivotal movement of said first jaw.

7. The pipe manipulating tool as set forth in claim 1, further comprising a protective sleeve covering a free end of at least one of said first arcuate band portion and said second arcuate pipe engaging portion.

8. The pipe manipulating tool as set forth in claim 1, further comprising a replacement jaw for replacing said first jaw, said replacement jaw having an arcuate band portion with a different radius than a radius of said arcuate band portion of said first jaw, whereby said first jaw can be replaced by said replacement jaw for engaging and turning pipe of a different diameter.

9. The pipe manipulating tool as set forth in claim 1, wherein said spring means comprises a rubber strap.

10. The pipe manipulating tool as set forth in claim 1, wherein said handle has a central longitudinal axis and said pivot connection point is located along said axis.

11. The pipe manipulating tool as set forth in claim 1, wherein said mounting portion comprises a forked portion that straddles said handle, said pivot connection point extending through said forked portion.

12. The pipe manipulating tool as set forth in claim 11, wherein said forked portion includes two substantially flat side plate members and an abutment portion bridging the side plate members at an end of the side plate members opposite the arcuate band portion, said spring mounting means being formed in said abutment portion.

13. A pipe manipulating tool comprising:

an elongated handle;

a pipe engaging portion connected at one end of the handle, said pipe engaging portion having means for securely gripping a portion of a pipe for selectively manipulating the pipe when a unidirectional force is applied to said handle;

said means for gripping comprising a first jaw pivotally mounted to said handle about a pivot connection point, and a second jaw fixedly mounted to said handle, said first and second jaws constructed so as to engage opposite sides of a pipe during use;

a spring means for biasing said first jaw into clamping engagement with a pipe during use;

said first jaw including an arcuate pipe engaging portion, and an abutment portion having means for limiting pivotal movement of the first jaw, said pivot connection point being located between the arcuate pipe engaging portion and the abutment portion; and a flange connected to an intermediate portion of said handle, said spring means comprising a tension spring connected between said flange and said abutment portion;

wherein said flange includes a plurality of apertures spaced along a length thereof to adjust a tension in said spring.

14. The pipe manipulating tool as set forth in claim 13, wherein said arcuate pipe engaging portion of said first jaw extends circumferentially from said handle approximately 160 to 200 degrees in a first direction and said second jaw includes a second arcuate pipe engaging portion extending circumferentially from said handle approximately 20 to 50 degrees in a second direction opposite from said first direction, whereby said first and second jaws engage generally opposite sides of a pipe to be turned during use.

15. The pipe manipulating tool as set forth in claim 14, further comprising a reinforcing flange connected to said handle adjacent said pipe engaging portion on a side of said handle opposite said arcuate pipe engaging portion of said first jaw, said reinforcing flange having an abutment surface for engaging said abutment portion of said first jaw to limit pivotal movement of said first jaw.

16. The pipe manipulating tool as set forth in claim 13, wherein said spring means is a rubber strap.

17. The pipe manipulating tool as set forth in claim 13, further comprising a protective sleeve covering a free end of at least one of said first arcuate band portion and said second arcuate pipe engaging portion.

18. A pipe manipulating tool, comprising:

a handle; and a pipe engaging portion, said pipe engaging portion comprising a first jaw pivotally mounted to said handle about a pivot connection point, a second jaw fixedly mounted to said handle, and a spring means for biasing said first and second jaws into gripping engagement with opposite sides of a pipe during use;

wherein said first jaw includes a first arcuate portion extending from said handle in a first direction, said second jaw includes a second arcuate portion extending from said handle in a second direction opposite from said first direction, a length of said first arcuate portion being greater than said second arcuate portion, and a rubber sleeve covering a free end of at least one of said first and second arcuate portions.

19. The pipe manipulating tool as set forth in claim 18, wherein said rubber sleeve comprises a rubber sleeve covering a free end of each of said first and second arcuate portions.

\* \* \* \* \*